United States Patent [19]

Kriete et al.

[11] Patent Number: 4,484,105
[45] Date of Patent: Nov. 20, 1984

[54] CIRCUIT FOR SELECTIVELY EXCITING ONE OF A PAIR OF LIGHT EMITTING DIODES

[75] Inventors: Richard J. Kriete, Little Ferry; Rafael R. Orsini, Fort Lee; Leon Weinglass, Edison, all of N.J.

[73] Assignee: AT&T Technologies, Inc., New York, N.Y.

[21] Appl. No.: 437,245

[22] Filed: Oct. 28, 1982

[51] Int. Cl.³ ................................................ H01J 1/60
[52] U.S. Cl. .................................... 315/133; 315/134; 315/147; 315/322
[58] Field of Search ................ 250/551; 315/322, 363, 315/133, 134, 147

[56] References Cited

U.S. PATENT DOCUMENTS

| | | | |
|---|---|---|---|
| 2,076,987 | 4/1937 | Edwards | 315/322 |
| 3,191,039 | 6/1965 | Gucwa | 315/133 |
| 3,733,497 | 5/1973 | Warnod | 315/133 |
| 4,395,660 | 7/1983 | Waszkiewicz | 250/551 |

*Primary Examiner*—Harold Dixon
*Attorney, Agent, or Firm*—R. F. Kip, Jr.

[57] ABSTRACT

A circuit for selectively lighting one of a pair of light-emitting diodes (LEDs) arranged in a parallel, back-to-back, circuit configuration also known as an anti-parallel circuit configuration. One side of the configuration is connected with ground connecting means through a first photon-emitting device which device is optically coupled to a first photon-responsive device connected between the other side of the configuration and a current source. The other side of the configuration is also connected with a ground connecting means through a second photon-emitting device which device is optically coupled to a second photon-responsive device connected between the first side of the configuration and the current source. Shunting means having a resistance value larger than the value of the first or second photon-responsive device when either is conducting is connected in parallel across the first photon-responsive device such that when ground is connected to one side of the configuration current flows from the source of current through the shunting means and the first photon-emitting device causing the first photon-emitting device to emit photons which impinge on the first photon-responsive device driving it into conduction to bypass the shunting means thereby allowing sufficient current to flow through and ignite one of the pair of LEDs. Similarly, when ground is connected to the other side of the configuration current flows from the current source through the shunting means and the second photon-emitting device causing it to emit photons which impinge on the second photon-responsive device driving it into conduction to bypass the shunting means such that current flows through and ignites the other of the pair of LEDs. The circuit can also be used in a switching matrix.

4 Claims, 3 Drawing Figures

CIRCUIT FOR SELECTIVELY EXCITING ONE OF A PAIR OF LIGHT EMITTING DIODES

TECHNICAL FIELD

This invention relates to a circuit for selectively exciting a light emitting diode and more particularly to a circuit for selectively lighting one of a pair of light emitting-diodes (LED) which are arranged in a parallel, back-to-back circuit configuration.

BACKGROUND OF THE INVENTION

Many modern computer and telephone systems have consoles arranged with multi-colored light displays to exhibit the operation of the system to a console operator. Typically the light displays comprise a red/green light at each position on the console to indicate the on/off status of that position—for instance in a telephone system the red/green light indicates whether a particular telephone line is busy (green) or idle (red).

As systems have become more complex and powerful and have become able to perform more functions and process more telephone calls while servicing more customers, attendant consoles have had to be expanded to include additional lights so as to be better able to indicate complete system operation. Bulbs have been replaced by light emitting diodes (LED's) to reduce power consumption and heat while also allowing a greater number of light indicators to be located in the same area of console face space. Further, the sophistication of programs responsible for managing systems with which consoles operate has also provoked requirements for more and more light positions on the console face to indicate various phases of system operation. Also, two colored LED's are typically positioned in a single two lead mounting which requires current reversal in the console circuitry in order to be able to selectively ignite one of the two LED's. These additional light position requirements, the incorporation of smaller colored indicators (LED's) into the console face and current reversal requirements have placed design and space burdens on the associated circuitry located in the console which circuitry is responsible for selectively lighting any one of the plurality of colored light positions on the console face.

Circuitry using solid state devices arranged in matrixes to selectively ignite console colored light positions have been used to better utilize console cabinet space while also consuming less power. Additionally, switching matrixes arranged with light coupled devices to replace relays and other electromechanical devices further reduce console space requirements and power consumption. Even with these newer arrangements, however, switching matrixes required to selectively light one color of a multi-color LED position on a console are still complex and require various power circuit configurations to selectively light different colored lights.

There is a need, therefore, for a simple circuit to selectively light one color of a multi-colored LED located in an array of LED's and using only a single source of power while also insuring that sufficient current flows through the LED to maintain the lighted LED.

SUMMARY OF THE INVENTION

The above problems are solved by the present invention in which a circuit for selectively lighting one of a pair of light emitting diodes connected in a parallel, back-to-back, circuit configuration comprises a first photo-responsive semi-conductor device connected to one side of the pair of light emitting diodes and a second photo-responsive semi-conductor device connected to the other side of the pair of light emitting diodes. The first photo-responsive device is optically coupled with a first photo-emitting device which is connected to the other side of the pair of light emitting diodes and the one side of the pair of light emitting diodes is connected to a second photo-emitting device which is light coupled to the second photo-responsive device. Shunting means is connected across the first photo-responsive device and both photo-responsive devices are connectable with a source of current. The circuit further comprises means for selectively connecting the first or second photo-emitting devices to ground such that when the first photo-emitting device is connected to ground current flows through the shunting means and the first photo-emitting device driving the first photo-emitting device to emit light to excite the optically coupled first photo-responsive semi-conductor device into conduction thereby producing sufficient current to light one of the pair of LED's; and when ground is connected to the second photo-emitting device current flows through the shunting means and the second photo-emitting device driving the second photo-emitting device to emit light to excite the optically coupled second photo-responsive semi-conductor device into conduction thereby producing sufficient current to light the other of the pair of LED's.

BRIEF DESCRIPTION OF THE DRAWINGS

Other advantages and features of the invention will be apparent from the following detailed description of a specific embodiment thereof, when read in conjunction with the accompanying drawings in which.

DETAILED DESCRIPTION

Figure 1:
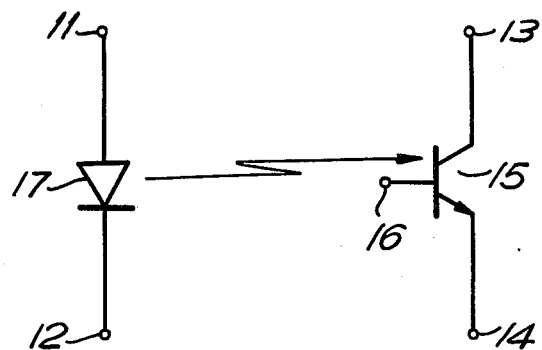
FIG. 1 is a schematic drawing of a photon-coupled device.

In the photon, or light, coupled circuit of FIG. 1 in the absence of a current between terminals 11 and 12 no current can flow between terminals 13 and 14 unless photo-transistor 15 is forward biased with the application of a potential to terminal 16 which potential is greater in magnitude than the potential appearing at terminal 14. When current flows between terminals 11 and 12 through diode 17, typically a gallium aluminum arsenide diode, the diode emits photons, or light, which impinge on the base region of photo-transistor 15 thereby exciting the photo-transistor into conduction, which occurs even if photo-transistor 15 is not forward biased by an external source. In general, the current flowing between terminals 13 and 14 is dependent upon both the intensity of the photon-stream emitted by diode 17 (which in turn is proportional to the magnitude of the current flowing between terminals 11 and 12), and the externally applied bias at terminal 16 if there is one.

Figure 2:
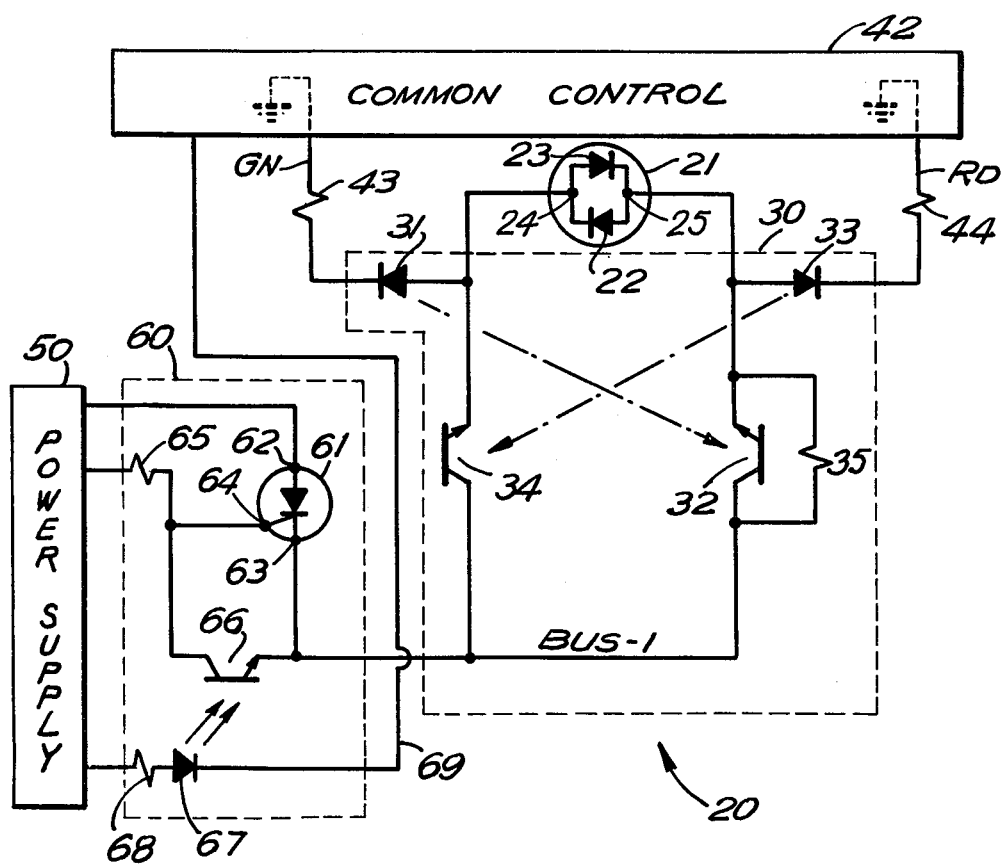
FIG. 2 is an illustrative embodiment of the present invention using photon-coupled devices to drive dual colored LED's.

FIG. 2 represents a circuit arrangement 20 utilizing the present invention and comprising light emitting diode circuit configuration 21 having two LED's 22 and 23 connected in a parallel, back-to-back circuit configuration, also known as an anti-parallel circuit configuration, between terminals 24 and 25. Current flowing in a direction from terminal 24 to terminal 25 ignites LED 23 and current flowing in the opposite direction, that is from terminal 25 to terminal 24, ignites LED 22. LEDs 22 and 23 can be epitaxial gallium arsenide phosphide chips encapsulated in a clear plastic globe. One of the chips is doped with nitrogen to glow green and the other with zinc and oxygen to glow red when sufficient current, typically 20 ma, flows through the LED. In the present arrangement LED 22 is considered as the green emitting device and LED 23 is the red emitting device. A light emitting diode which can be used as configuration 21 is the 548AA LED manufactured by the Western Electric Company, Incorporated, of New York, N.Y.

Circuit 20 also includes switching circuit 30, comprising a pair of photon-coupled devices 31–32 and 33–34, which circuit 30 interconnects with terminals 24 and 25. Photon-emitting device 31 is optically coupled to photo-transistor 32 while photon-emitting device 33 is optically coupled to photo-transistor 34. The base terminals of transistors 32 and 34 are not connected, thus making the conduction through photo-transistors 32 and 33 entirely dependent upon photons emitted by devices 31 and 33 respectively. When current, typically 0.5 ma, passes through device 31 it emits light, or photons, which impinge on optically coupled photo-transistor 32 thereby exciting photo-transistor 32 into conduction. Similarly, when current passes thru device 33 it emits photons which impinge on optically coupled photo-transistor 34 thereby exciting photo-transistor 34 into conduction. A photon-coupled device which can be used herein as photon-coupled devices 31–32 or 33–34 is the 2B opto-isolator manufactured by Western Electric Company, Incorporated of New York, N.Y.

Circuit 30 also includes current initiating resistor 35 connected in parallel with photo-transistor 32. Resistor 35 has a resistance value which permits current having a magnitude sufficient to light either of diodes 31 or 32 but not sufficient to ignite either of LEDs 22–34 to initially flow in circuit 30. Further, resistor 35 has a value substantially larger than the resistance value presented by transistors 32 or 33 when either transistor is switched on and begins conducting. In the present circuit resistor 35 is 20,000 ohms.

Photon-emitting device 31 is connected to terminal 24 of LED arrangement 21 and to common control equipment 42 over lead GN through resistor 43 while photon-emitting device 33 is connected to terminal 25 of LED arrangement 21 and to common control equipment 42 over lead RD through resistor 44. Photo-transistor 32, which is optically coupled to photon-emitting device 31, is connected to terminal 25 and photo-transistor 34, which is optically coupled to photon-emitting device 33, is connected to terminal 24. Both photo-transistors 32 and 34 are also connected to power supply 50, typically +12 volts, through gate circuit 60 and power bus BUS-1.

Gate circuit 60 comprises silicon controlled rectifier (SCR) 61 having its anode 62 connected to power supply 50 and cathode 63 connected to bus BUS-1. Gate terminal 64 of SCR 61 is connected to power supply 50 through current limiting resistor 65 and to bus BUS-1 through photo-resistor 66. The signal transmitted from power supply 50 and appearing at gate terminal 64 turns on SCR 61 such that bus BUS-1 is connected with power supply 50 through the anode 62-cathode 63 circuit of SCR 61 thereby providing current to switching circuit 30 when either of leads GN or RD are connected to ground by common control equipment 42.

SCR 61 is turned off by common control 42 connecting ground to photon-emitting diode 67, which is optically coupled to photo-transistor 66, such that current flows from power supply 50 through resistor 68 and photon-emitting device 67 over lead 69 to connected ground at common control 42. As photon-emitting device 67 conducts it emits photons which impinge on the base region of optically coupled transistor 66 thereby turning resistor 66 on and presenting a low resistance path between resistance 65 and bus BUS-1 to short out gate terminal 64 of SCR 61. When common control circuit 42 removes ground from lead GN and RD and no current flows in bus BUS-1, SCR 61 is turned off. SCR 61 is not turned on until ground is removed by common control equipment 42 from lead 69 and light emitting diode 67 to turn off transistor 66 thereby removing the electrical short from gate 64 of SCR 61. Common control circuitry 42 can be, typically, the control circuitry for a Private Branch Exchange (PBX) which monitors various telephone lines interconnected with the PBX and excites a particular colored LED to indicate the busy/idle status of an associated line by connecting either of leads RD or GN to ground shown in dotted lines in FIG. 2.

Operation of FIG. 2 will now be described in detail. If it is desired to turn LED 22 (green) on, common control equipment 42 connects lead GN to ground and since gate terminal 64 of SCR 61 is connected to power supply 50 SCR 61 is driven into conduction. With SCR 61 conducting, current flows from power supply 50, through the anode 62-cathode 63 terminals of SCR 61, BUS-1, resistor 35, terminal 25, LED 22, photon-emitting device 31 resistor 43, lead GN to ground connected at common control 42. The amount of current flowing initially, typically 0.5 ma, is not sufficient to turn LED 22 on but is sufficient to partially energize photon-emitting device 31 such that it begins emitting photons which impinge on optically coupled photo-transistor 32. Since photo-transistor 32 is not biased, the photons striking the base region of photo-transistor 32 causes it to conduct, which transistor now presents a lower resistance current path than the parallel resistor 35 path thereby electrically shorting out resistor 35. As photo-transistor 32 turns on and becomes saturated the amount of current flowing in the circuit increases to approximately 20 ma thereby causing LED 22 to ignite and glow green. LED 22 will remain ON until common control 42 removes ground from lead GN at which time LED 22, diode 31, and photo-transistor 32 all turn off.

In the present circuit configuration, that is ground applied to lead GN and a signal applied to terminal 64 to ignite SCR 61, current cannot flow through photon-emitting device 33 and lead RD since lead RD is connected to an open circuit at common control 42.

When it is desired to selectively turn LED 23 (red) on, common control 42 connects ground to lead RD. Since SCR 61 is turned on, current now flows from source 50 through the anode 62-cathode 63 terminals of SCR 61, BUS-1, resistor 35, photon-emitting device 33, resistor 44 and lead RD to ground at common control 42. As current flows in the path, photon-emitting device 33 begins to emit photons which impinge on optically coupled photo-transistor 34 causing transistor 34 to turn on. Turned on transistor 34, lead 43 and LED 23 now present a lower resistance current path between bus Bus-1 and photon-emitting device 33 than resistor 35, thereby electrically shorting out resistor 35. As transistor 34 turns on and begins to conduct, more current flows and causes LED 23 to switch ON and glow red. LED 23 will remain ON until common control 42 removes ground from lead RD thereby disconnecting the circuit from ground and causing LED 23, diode 33, and photo-transistor 34 to turn off.

Thus by utilizing the circuit configuration shown in FIG. 2 a particular LED of a dual LED arrangement 20 can be turned on from a connection to a single power supply 50. Additionally, the operation of either photo-transistor 32 or 34 insures that sufficient current flows through LED arrangement 21 to light one of the LED's 22-23 and to maintain the LED in a lighted condition.

Figure 3:
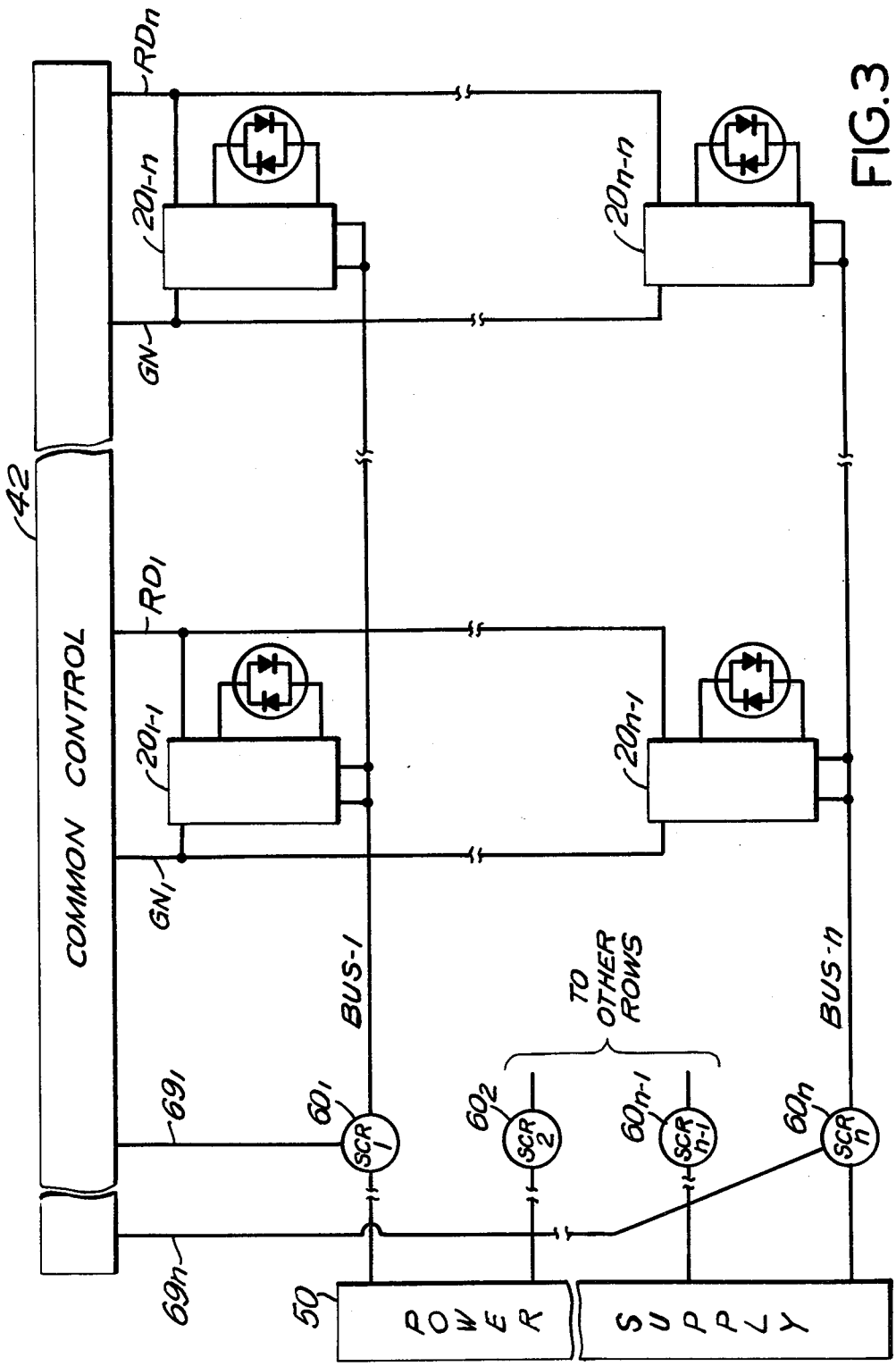
FIG. 3 depicts the present invention used in a switching matrix.

FIG. 3 represents a matrix of the LED circuits 20 of FIG. 2 arranged in horizontal rows and vertical columns. Each row comprises a plurality of LED circuits for example the top row of FIG. 3, comprises LED circuits $20_{1-1}$ to LED circuit $20_{1-n}$ with each circuit interconnected with common power bus BUS-1. Each column of LED circuits comprises a plurality of LED circuits and has two buses connected with each LED circuit 20 in the column; for instance column 1 has a plurality of LED circuits $20_{1-1}$ to $20_{n-1}$ all interconnected with vertical buses $GN_1$ and $RD_1$.

The matrix shown in FIG. 3 operates in a manner similar to the operation of circuit 20 described above. For instance, when it is desired to turn ON the Green (LED 22 of FIG. 2) in configuration $20_{n-n}$, as common control 42 connects bus $GN_n$ to ground such that current now flows from power supply 50, through $SCR_n$ of circuit $60_n$ which was previously turned on, $Bus_{-n}$, LED circuit $20_{nn}$, bus $GN_n$ to ground. To turn off the LED, common control circuit 42 removes ground from bus $GN_n$ thereby opening the circuit. Thus by using circuit 20 of FIG. 2 in the matrix arrangement of FIG. 3, a particular LED in the matrix can be turned on.

It will also be apparent that one skilled in the art may make various modifications and changes to the apparatus disclosed herein without departing from the spirit and scope of this invention.

What is claimed is:

1. A circuit for selectively lighting one of a pair of light emitting diodes arranged in a parallel configuration so as to be oppositely poled to conduct current in opposite parallel paths, said circuit comprising:
   a first photon-responsive device connected to one side of the pair of light emitting diodes;
   a second photon-responsive device connected to an opposite side of the pair of light emitting diodes;
   means for connecting a current source with both photon-responsive devices;
   shunting means connecting across the first photon-responsive device having a resistance value which is substantially greater than the resistance of the first photon-responsive device when it is conducting;
   a first photon-emitting device optically coupled with the first photon-responsive device and connected to the opposite side of the pair of light emitting diodes;
   a second photon-emitting device optically coupled with the second photon-responsive device and connected with the one side of the pair of light emitting diodes; and
   means for selectively connecting ground to the first or second photon-emitting devices such that when ground is connected to the first photon-emitting device current flows from the current source connecting means through the shunting means and the first photon-emitting device driving the first photon-emitting device to emit light to excite the optically coupled first photon-responsive device into conduction thereby producing sufficient current to light one of the pair of light emitting diodes and when ground is connected to the second photon-emitting device current flows through the shunting means and the second photon-emitting device driving the optically coupled second photon-emitting device to emit light to excite the second photon-responsive device into conduction thereby producing sufficient current to light the other of the pair of light emitting diodes.

2. A circuit as recited in claim 1 wherein when the first or second photon-responsive devices begin conducting the shunting means is electrically shorted from the circuit and sufficient current flows to ignite one of the light emitting diodes.

3. A circuit as recited in claim 2 wherein the resistance value of the shunting means is such to allow sufficient current to flow to ignite either the first or second photon-emitting devices but not sufficient to ignite one of the pair of light emitting diodes.

4. A circuit comprising, a pair of terminals for providing current for said circuit; a pair of light emitting diodes connected in series with said terminals in a parallel configuration to conduct current in opposite directions between first and second junction points, and each adapted to emit light only upon passage therethrough of current of normal value, path selector means establishing first and second paths for current flow to one of said terminals from, respectively, said first and second junction points, and adapted to select one at a time of either of said paths for flow therethrough of current; current limiting means connected between one of said junction points and the other of said terminals to establish flow, directed from said other terminal to said one terminal through the current limiting means and passing through whichever of said paths is then selected for current flow by said selector means, of current which in that path is reduced in value relative to said normal value; and first and second switching means connected between said second and first junction points and said other terminal and responsive to such current flow, in respectively said first path and said second path, to operate to connect said other terminal, by a lower impedance connection than that provided by said limiting means, to, respectively, said second junction point and said first junction point of said configuration so as, thereby, to establish flow of normal value current through whichever of said light emitting diodes is poled to conduct current passage from said other terminal through said so-operated switching means, said configuration and the selected one of said paths to said one terminal.

* * * * *